June 28, 1927.

R. F. CRAWFORD 1,633,846

POWER HOIST FOR DUMP TRUCKS

Filed May 5, 1926

6 Sheets-Sheet 4

Inventor

R. F. Crawford.
E. W. Anderson Jr.

Attorney

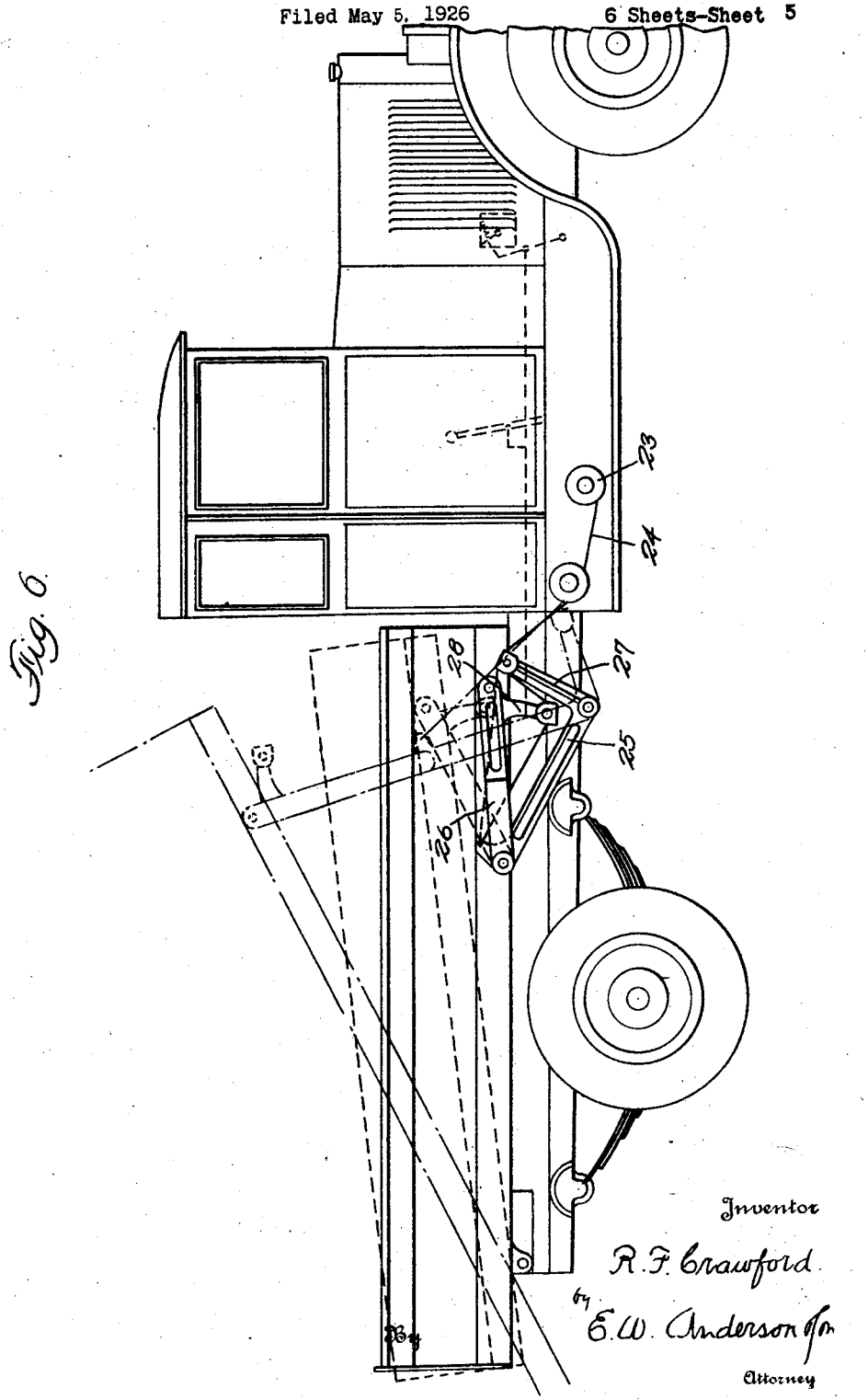

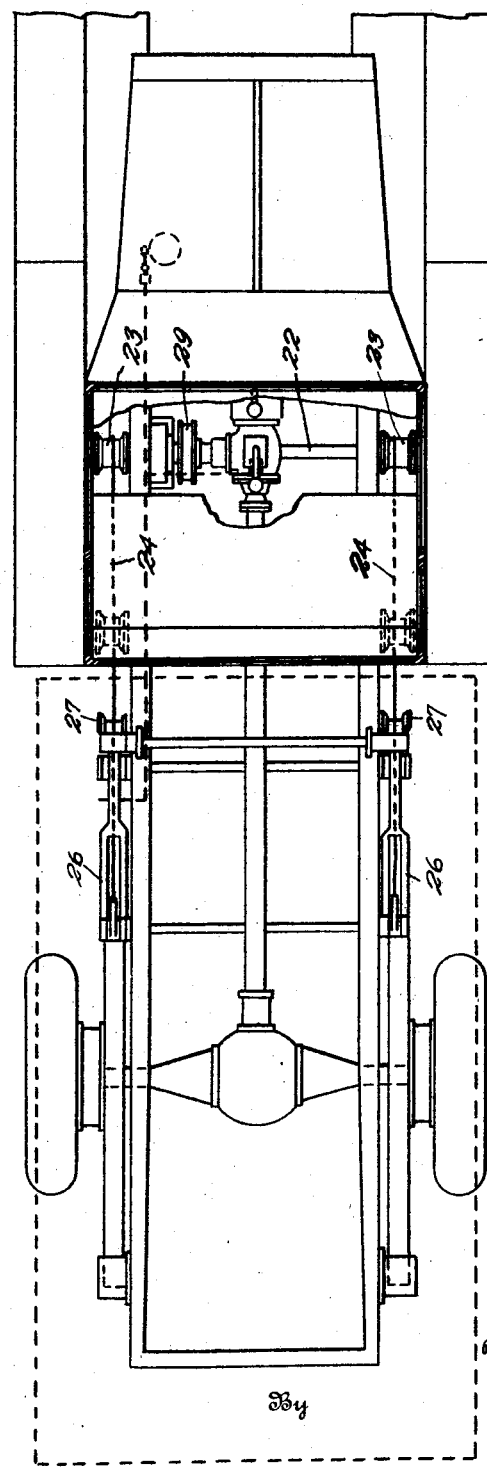

Patented June 28, 1927.

1,633,846

UNITED STATES PATENT OFFICE.

RALPH F. CRAWFORD, OF SALINA, KANSAS.

POWER HOIST FOR DUMP TRUCKS.

Application filed May 5, 1926. Serial No. 106,944.

The invention has relation to power hoists for dump trucks, having for an object the provision of an improved means for the purpose wherein a plurality of hoisting speeds and a reverse for lowering the body may be obtained with a maximum of simplicity, and wherein the truck body may be mounted at a lesser height and at a point farther forward on the chassis than is now possible with devices of this character. According to this invention power is derived directly from the motor of the truck, being taken off from the propeller shaft in rear of the transmission. Automatic control devices are also provided whereby the mechanism may operate automatically with the greatest possible efficiency.

The invention consists in the novel construction and combination of parts as set forth in the appended claim.

Figure 1:
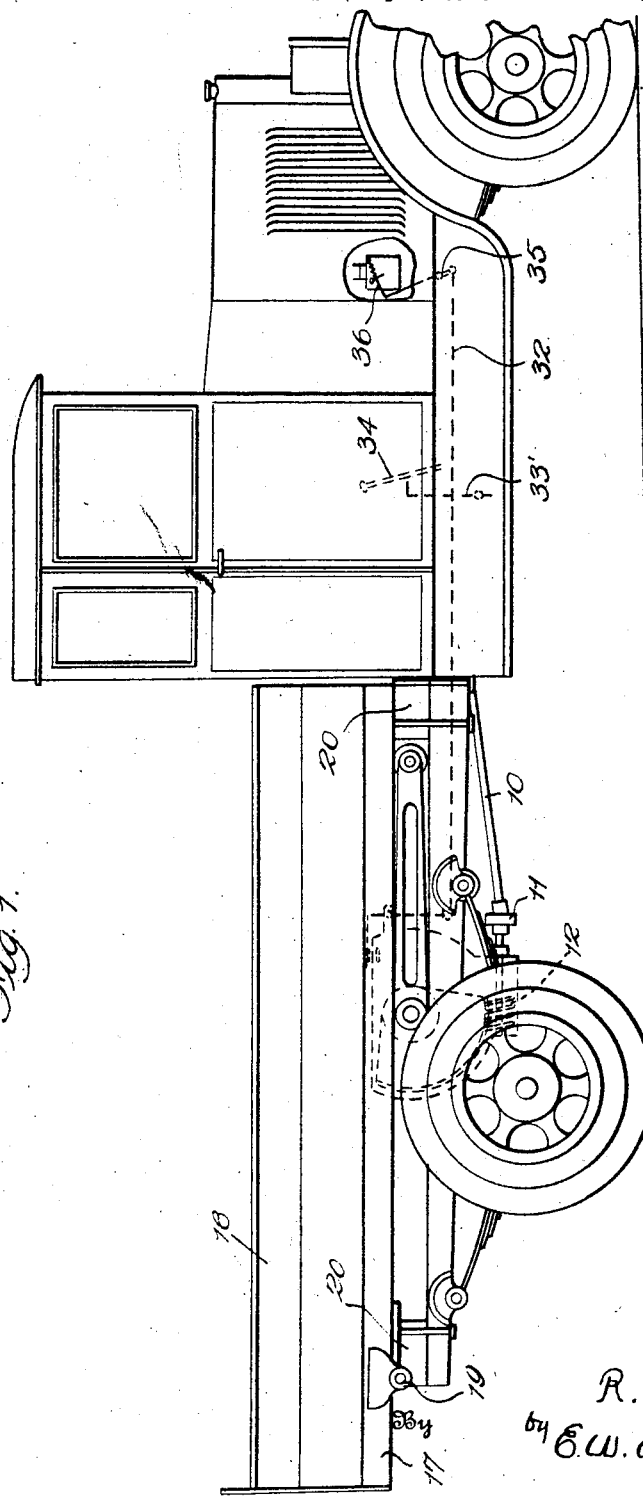
Figure 2:
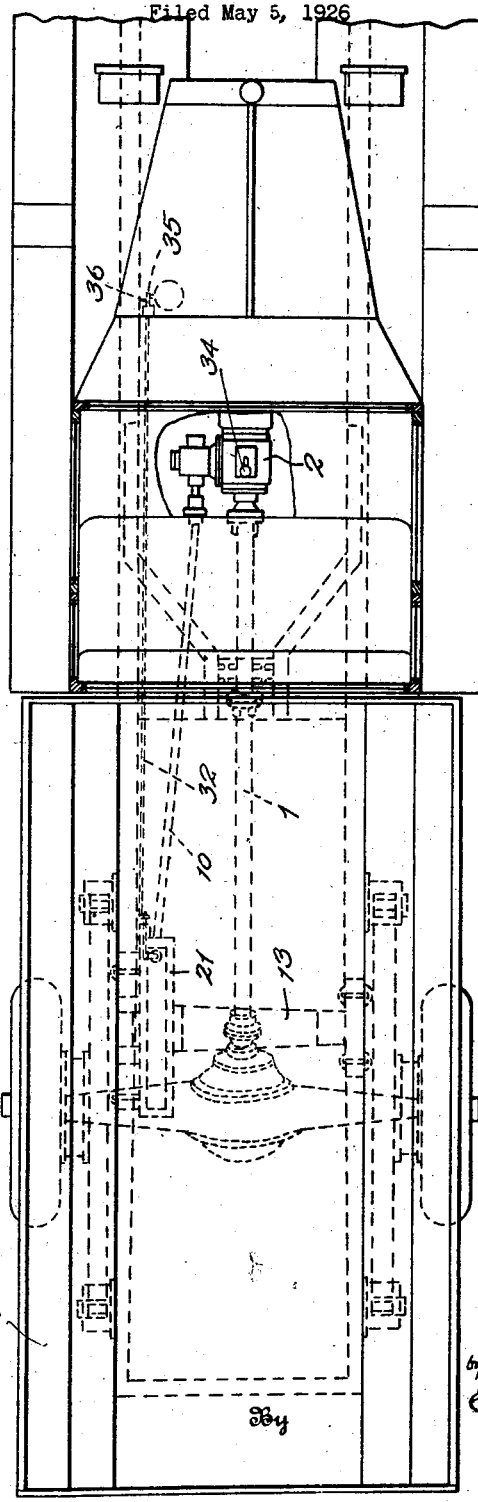
Figure 3:
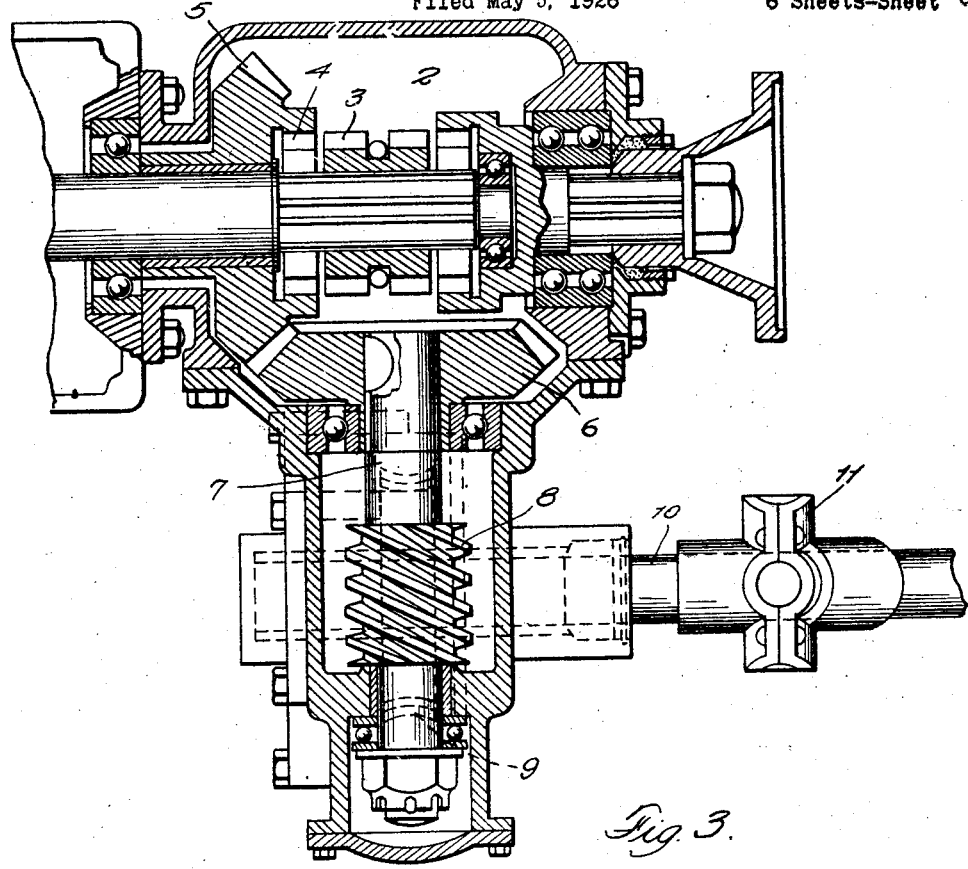
Figure 4:
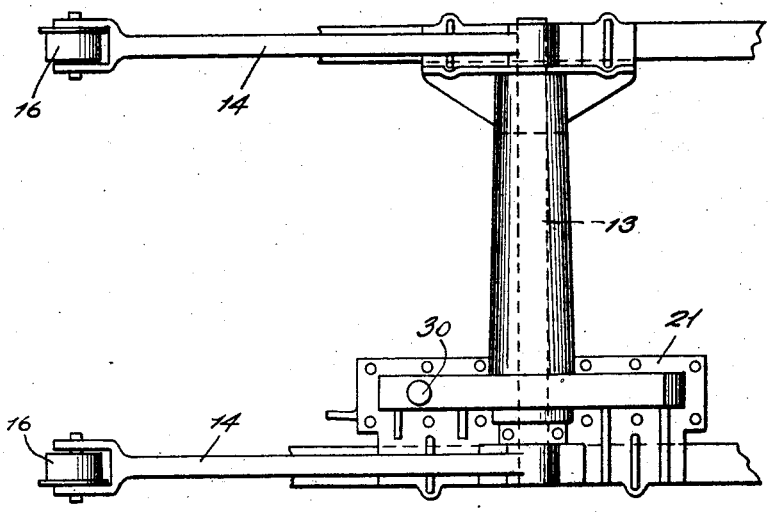
Figure 5:
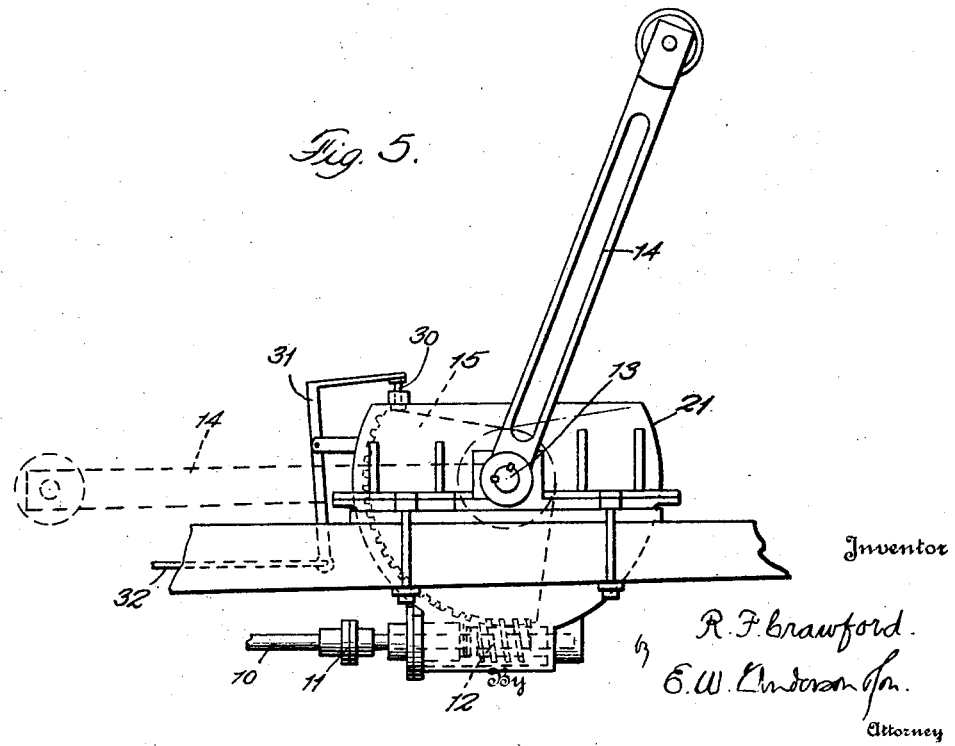

In the accompanying drawings, illustrating the invention, Fig. 1 is a side view of a dump truck embodying the invention. Fig. 2 is a plan view of the same. Fig. 3 is a detailed cross-sectional view of the clutch and hoist take-off devices. Fig. 4 is a detailed plan view of the hoist gearing and arms. Fig. 5 is a side view of the same. Fig. 6 is a side view of a truck equipped with a modified form of hoist mechanism. Fig. 7 is a plan view of the same. In these drawings numeral 1 designates the propeller shaft of the truck, said shaft being divided immediately in rear of the well-known transmission mechanism and equipped with a clutch 2 having a member 3, adjustable by a suitable means, controlled from the cab of the truck, into any one of three positions, a central neutral position, a rearward position for effecting a clutch between the forward and rear halves of the propeller shaft, and a forward position effecting a clutch between the forward half of the propeller shaft and the hoist take-off. In the forward position, the clutch member engages suitable clutch teeth 4 in bevel gear member 5, meshing with a bevel gear 6 on countershaft 7, upon which is mounted a worm gear 8. Worm gear 8 meshes with a pinion 9, fast upon shaft 10, suitably supported from the chassis and provided with universal joints 11 and at its rear end with a worm gear 12. The countershaft is mounted in bearings of the frame, and provided with opposite lifting arms 14, 14 and also with a segment gear 15 meshing with worm gear 12. The free ends of the arms 14 are provided with rollers 16, 16 engaging suitable tracks fast to the bottom of the dump body 18, said body being pivoted at 19 to the rear member of a pair of transverse spacing beams 20, 20 upon which the body normally rests.

The arrangement of the hoisting mechanism is such that the beams 20 may support the body within about 4 inches of the main frame, so that the body is mounted much lower than is common in trucks of this character. It will also be observed that the hoisting mechanism is located entirely below the dump body, so that this body may be mounted well forward, with a minimum clearance between the same and the cab.

The gears 12 and 15 are enclosed in a housing 21, so that they may be run in oil.

With the arrangement described, member 3 being in clutch with the teeth 4, the hoisting gears are in connection with the drive shaft motor, and may be operated at any of the speeds provided by the transmission. The worm gears 8 and 12 will act as brakes in maintaining the body in hoisted position after the clutch 2 has been disengaged, and lowering of the body may be accomplished by throwing the transmission mechanism into reverse, and engaging member 3 with the teeth 4.

In the modified form of the invention shown in Figs. 6 and 7 the same clutch devices are employed, whereby a shaft 22 may be driven to hoist the body. Shaft 22 extends transversely of the main frame and is provided at its opposite ends with drums 23, 23 whereon suitable cables or chains 24, 24 are wound, said chains extending rearwardly and being attached to members of opposite sets of toggle links 25, 26. The members 25 of the toggle links are pivoted in bearings of the main frame, the links 26 being pivoted to the dump body. When shaft 22 is clutched to the drive the cables 24 are wound upon drums 23 and the toggle links 25, 26 are straightened into the dotted line position shown in Fig. 6. In order to give the cables 24 better leverage in starting the hoist, arms 27, 28 are extended from the links 25, 26 and provided at their free ends with pulleys engaging the cables, these arms extending toward each other and lying one behind another so that the cable will extend in zig-zag position when the body is in lowered position, and so that the cable will tend to straighten out and pull at right angles against the arms 27, 28 until the toggle links have been opened to a position providing sufficient leverage for the hoist.

In this form of the invention a brake 29 is provided upon shaft 22, whereby the body may be held in hoisted position.

In order to provide for the automatic disengagement of clutch 2 when the body has been brought to the fully raised position, a plunger 30 is mounted on the housing 21 in position to be operated by segment 15 as the latter is fed by the worm 12 to its extreme position. Plunger 30 contacts with an intermediately pivoted lever 31 connected to a rod 32, extended forwardly beneath the cab and provided with an operating connection 33 for the clutch control lever 34. Rod 32 may also have an operating connection 35 with the throttle lever 36, whereby the throttle may be operated and the fuel supply to the motor automatically decreased.

I claim:

In a hoist for dump truck bodies, the combination with a motor, fuel supply means therefor having a throttle, a pivoted dump body, hoisting mechanism therefor, and a power connection between said motor and said hoisting mechanism including a clutch, of means operable by said hoisting mechanism to operate the throttle in said fuel supply means and to disengage said clutch.

In testimony whereof I affix my signature.

RALPH F. CRAWFORD.